J. C. PHELPS.
OUTLET CAP AND METHOD OF MAKING THE SAME.
APPLICATION FILED NOV. 1, 1917.
1,313,329.
Patented Aug. 19, 1919.
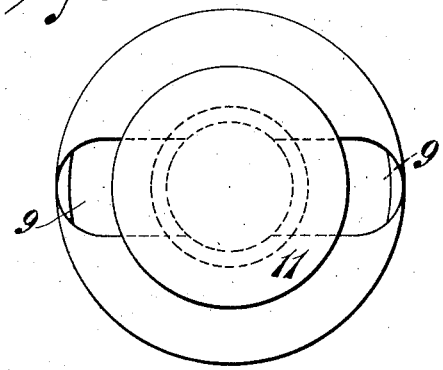
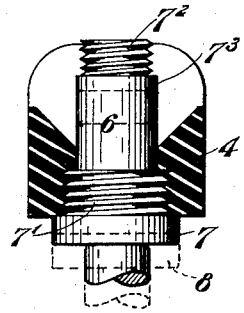
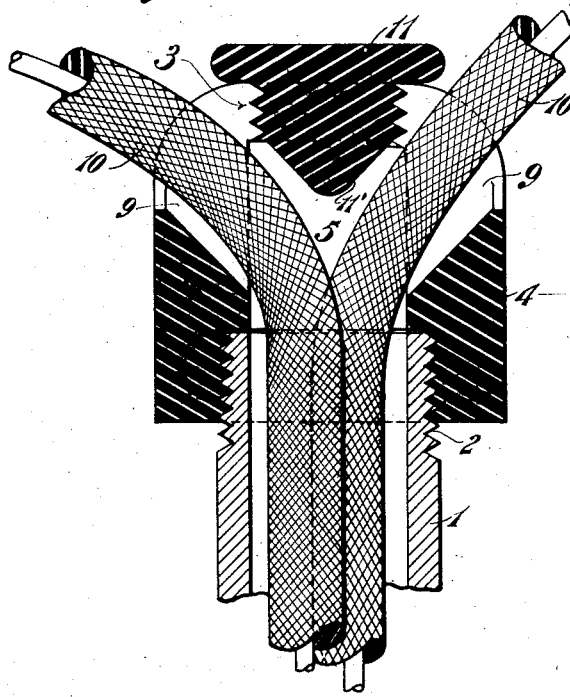
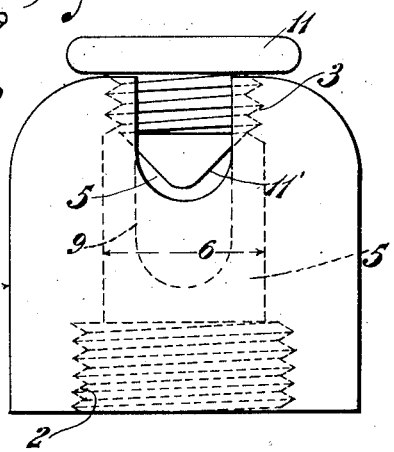
WITNESS:
INVENTOR,
James C. Phelps,
BY
Harry W. Bowen.
ATTORNEY.

UNITED STATES PATENT OFFICE.

JAMES C. PHELPS, OF SPRINGFIELD, MASSACHUSETTS.

OUTLET-CAP AND METHOD OF MAKING THE SAME.

1,313,329.  Specification of Letters Patent.  Patented Aug. 19, 1919.

Application filed November 1, 1917. Serial No. 199,665.

*To all whom it may concern:*

Be it known that I, JAMES C. PHELPS, citizen of the United States of America, residing in the city of Springfield, county of Hampden, Commonwealth of Massachusetts, have invented certain new and useful Improvements in Outlet-Caps and Methods of Making the Same, of which the following is a specification.

This invention relates to improvements in electrical fittings and specifically it relates to insulating caps which are used on the ends of electric conduits in which insulated wires for conducting an electric current are located.

An object of the invention is to provide a closure device which will permit the electric wires to be readily drawn through the conduit by hand or any other suitable means, then securing a removable plug in the end of the same for spreading or separating the wires.

If desired the electric wires may be first drawn through the conduit, then, the insulating cap is slipped over the wires and secured to the outlet end of the threaded conduit by rotating the cap; the construction of the cap being such that when the cap is rotated the wires within the conduit will not be disturbed or twisted about each other. The construction of the present cap is such that it can be readily formed of insulating material when in a plastic state by molding the same in a suitable mold; the opening extending therethrough may also be formed at the same time about a suitable forming tool which is provided with threads of different diameters for the purpose of permitting the easy removal of the tool after the plastic material has set. The forming tool serves to produce a set of threads for attaching the cap to the conduit and another set of threads at its upper end for receiving a threaded plug and cap-piece, for closing the upper end and for permanently spreading the wires.

Further objects and nature of the device will fully appear in the body of the specification and will be particularly pointed out in the claims.

Referring to the drawings:

Figure 1 is a top plan view of the insulating cap showing laterally disposed openings for the outlet wires, also, the plug and cap-piece for closing its upper end.

Fig. 2 is a detail sectional view of the conduit and insulating cap taken on a plane passing through the axis of the conduit and cap and showing two of the electric wires in place in the conduit and cap, also, clearly illustrating the plug, and cap-piece for closing the upper end of the cap.

Fig. 3 is a view illustrating the external appearance of the insulating cap in full lines and in dotted lines the internally located threaded-portion for securing the cap to the conduit and the threaded portion at the top for receiving and securing in place the threaded plug.

Fig. 4 illustrates the manner of forming the opening through the insulating cap by means of the mandrel.

Referring to the drawings in detail, 1 designates the upper or outlet end portion of an electric conduit having the usual threads 2 to which the insulating cap is secured by threading the same on to the conduit. This cap, as shown, is formed from any suitable insulating material, when in a plastic state and preferably by molding. The upper end of the cap is formed with threads 3. The diameter of this threaded portion, it should be particularly observed, is smaller than the diameter of the threaded portion indicated at 2. The interior of the cap, which is indicated as a whole by reference numeral 4, is formed with an axially arranged opening 5, the diameter of the unthreaded portion of which is indicated by the dotted line 6, which diameter is slightly greater than the diameter of the threaded part 3 in order to permit the removal of the forming tool. These threads are formed in the insulating material composing the cap by means of the former tool indicated at 7, which is provided with threads 7' and $7^2$ to form the threads 2 and 3 respectively and the smooth cylindrical shaped opening $7^3$. After the plastic insulating material has been forced into the mold and has sufficiently set, the former 7 can be removed from the cap by simply unscrewing the same in a contra clockwise direction. The diameter of the threaded part 3 being smaller than the diameter of the unthreaded part indicated at 6 in Figs. 3 and 4, will readily permit the removal of the former as indicated by the dotted lines at 8. Formed in the upper end of the cap are laterally disposed openings 9, the axes of which are inclined to the axis of the cap. These openings are for the purpose of receiving the electric wires 10 shown in Fig. 2.

A threaded plug and cap-piece 11 also formed of insulating material is employed for closing the upper end of the cap by threading the same into the threaded opening 3, after the wires 10 are in place. The electric wires 10 are first drawn through the conduit 1 by any suitable means, either by hand or some mechanical devices. After the wires have been drawn through the conduit the cap 4 is slipped over the ends of the wires and the insulating cap secured to the conduit by threading. They are then separated from each other by bending them into the position shown in Fig. 2 in which position they occupy the openings 9. The plug 10 is then threaded in place, completely closing the end and serving to maintain the wires permanently separated by reason of the conical shaped end 11'. It is of course understood that more than two openings may be formed in the cap to receive the wires 10 as in a three wire system it would be necessary to have more than two openings. It is also understood that after cap 4 is in place and the plug 11 is removed, that the wires 10 may be drawn through the conduit by a direct or straight pull.

One of the advantages of the present invention is that the cap 4 can be threaded on to the conduit without twisting or disturbing the wires. It is also to be understood that the cap-portion of the plug 11 may be formed larger than that shown in the drawings for the purpose of serving as a hood for the wires in case the outlet cap is used in an exposed position where it would be necessary to protect the wires from the entrance of moisture or snow.

What I claim is:

1. A device of the kind described, comprising a member adapted to be secured to the threaded end of an electric conduit and having openings formed therein for receiving the electric wires as they emerge from the conduit, the upper end of the member being formed with an opening designed to receive a plug for closing the end of the member and for separating the wires.

2. An insulating cap for closing the end of an electric conduit, an axially arranged opening extending therethrough, the upper and lower ends of the opening being formed with threads, one of the threaded portions being designed for attaching the cap to the conduit, the other threaded opening being designed for receiving a plug for closing the opening and having a hooded portion extending over the upper end of the cap, its lower end being formed with a conical shaped surface for separating the wires, as described.

3. The method of forming an insulating cap for closing the outlet end of an electric conduit which consists in placing the insulating material when in a plastic state into a mold, for forcing the same around a former having threads at its ends which are of different diameters and a connecting portion between the threaded portion that is greater in diameter than the smaller threaded portion whereby when the molded material has set, the former may be removed by rotating the same out of the cap as described.

4. A cap for closing the end of an electric conduit and for separating electric wires therein, said cap including an axially arranged opening therethrough, other openings extending at an angle to the axially arranged opening, means for securing the cap to the conduit, the upper end of the cap having a threaded opening and a removable plug in said opening, the upper portion of which is formed with a hood and its lower end formed with a conical shaped portion for separating the wires.

5. An outlet cap for closing the end of an electric conduit comprising a one-piece member formed with a threaded part for attachment to a conduit and an opening therethrough to receive and to permit the same to be threaded on to a conduit without disturbing or twisting the wires, the outer end portion of the opening being threaded, a removable plug for closing the outer end of the opening and for separating the wires.

6. An outlet cap for closing the end of a conduit and comprising a member having an opening therethrough, the ends of the opening being threaded, laterally arranged openings leading into said opening for receiving and separating the wires, and means including a plug member for closing the outer end of the opening, said means also serving the purpose of spreading the wires and retaining them in the lateral openings.

7. The method of forming an outlet cap of molded insulating material which consists in inserting plastic material into a suitable mold and about a member having two threaded portions of different diameters for forming a threaded opening at one end for attaching the cap to a conduit, and a threaded opening at its opposite end for receiving a plug for closing the opening, the intermediate portion of the member being slightly larger than the smaller threaded portion to permit said member to be removed by unscrewing the member from the cap after the material has set.

8. In a device of the kind described, comprising a member adapted to be secured to the threaded end of an electric conduit and having openings formed therein for receiving the electric wires as they emerge from the conduit, the upper end of the member being formed with an opening designed to receive a plug for closing the end of the member.

JAMES C. PHELPS.

Copies of this patent may be obtained for five cents each, by addressing the "Commissioner of Patents, Washington, D. C."